Jan. 18, 1949. B. F. LANGER ET AL 2,459,171
TORQUE MEASURING DEVICE FOR SHAFTS
Filed Sept. 15, 1942 2 Sheets-Sheet 1

WITNESSES:
Wm. R. Sellers
C. F. Oberheim

INVENTOR
Bernard F. Langer and
Frank W. Godsey, Jr.
BY
Paul E. Friedemann
ATTORNEY

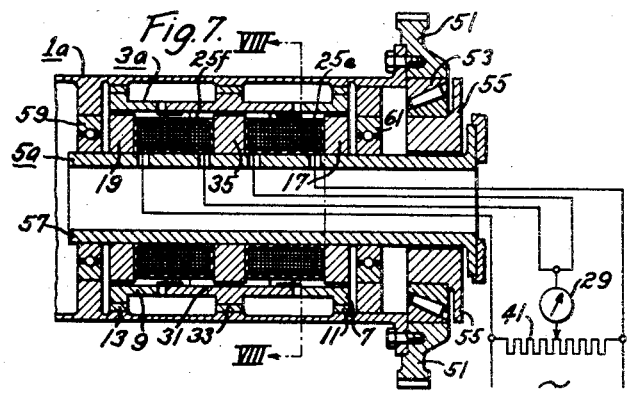
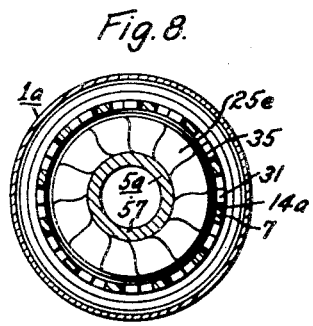
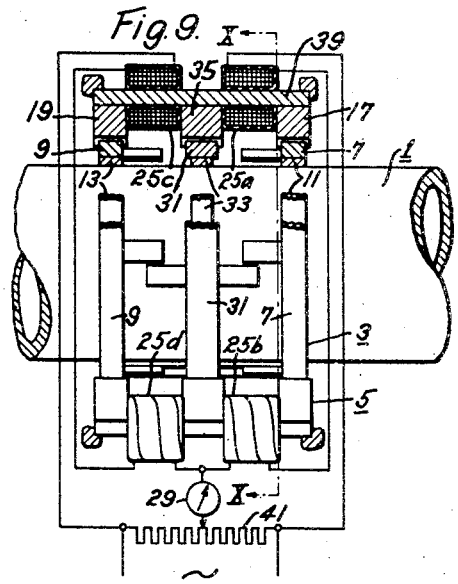
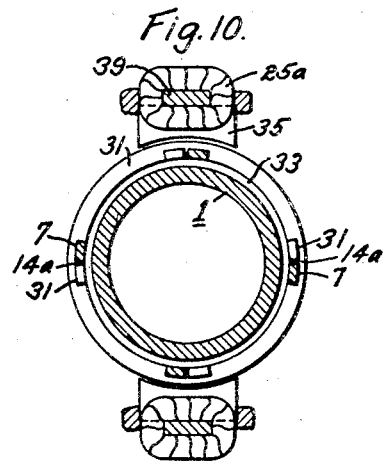
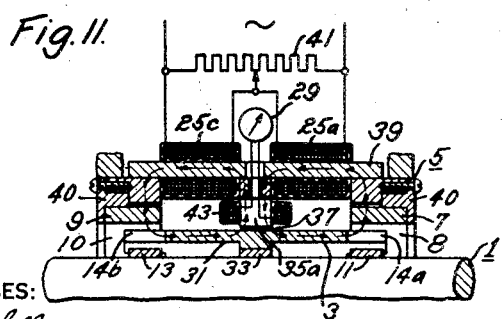
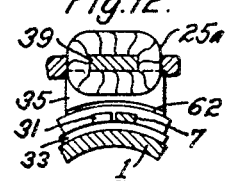

Patented Jan. 18, 1949

2,459,171

UNITED STATES PATENT OFFICE 2,459,171

TORQUE MEASURING DEVICE FOR SHAFTS

Bernard F. Langer, Pittsburgh, and Frank W. Godsey, Jr., Forest Hills, Pa., assignors to Westinghouse Electric Corporation, East Pittsburgh, Pa., a corporation of Pennsylvania Application September 15, 1942, Serial No. 458,378

21 Claims. (Cl. 73—136)

The present invention relates to torque indicating or measuring devices such as those operable in response to the elastic deformations of a shaft.

More particularly, the present invention relates to a novel electromagnetic device operable in response to the torque characteristics of a shaft transmitting power.

Numerous efforts have been made in the past to provide suitable devices for indicating or measuring the power transmitted by a rotating shaft without using the conventional dynamometer methods. They have consisted in part of the attachment of magnetic strain gauges, optical systems and the attachment of variable capacity electrical condensers on the shaft. Most of these devices operate in the manner of torque meters, which measure the torsional or circumferential distortions of a known gauge length of the shaft transmitting power which accurately reflects the torque being transmitted by the given shaft.

Most of the above schemes require the attachment of electrical connections to the shaft element by means such as slip rings on the shaft and brushes for picking up the current. However, due to the electrical characteristics of the slip ring and brush assembly, when the quantity to be measured is small, large errors are introduced into the metering system thus providing highly unsatisfactory indications of the desired shaft condition.

Another important disadvantage of other systems is that they require the use of mechanically delicate elements such as electric coils on the rotating member. This is undesirable in high speed applications. In the present device the rotating parts are all extremely rugged.

Efforts directed to overcoming these undesirable conditions have led to the development of the inductor generator type of measuring devices. In this type of device two inductor generators are displaced from each other along a shaft system and are so connected and arranged that their output voltages are equal and opposed in phase relation to each other when the shaft is rotating without load. When a load is connected to the rotating shaft, the shaft undergoes torsional deflection, that is, the shaft twists, and the phase relation of the one generator relative to the other is shifted such that a voltage difference will appear between the generated voltages indicative of the power being transmitted by the shaft. This condition obtains, however, only through a limited range of phase shift.

While this type of indicator is relatively simple and for some applications provides a ready means for measuring shaft horsepower, it has the disadvantage of requiring a relatively long gauge length of shaft. Further it is difficult to construct a generator of this type which is free from the error introducing effects of shaft bending, temperature, end thrust and calibration errors due to variations in the magnetizing source. Indications are that phase shifts of 5 to 10 electrical degrees will provide quite reliable operation, but such phase shifts are available only on long gauge lengths of shafts; the usual available phase shift being of the order of a fraction of an electrical degree. Another disadvantage lies in the fact that in order to indicate torque the speed effect must be eliminated from the generated voltages.

A further characteristic which may sometimes be undesirable is the fact that the device cannot be calibrated statically, by that is meant, that the shaft must be rotating in order that voltage may be generated.

A principal object of the present invention is to provide a torque measuring device that will respond to the torque characteristics of a shaft and produce an electrical current or voltage accurately indicative of the aforenamed characteristic.

Another object of the present invention is to provide a torque measuring device that will eliminate the use of slip rings and brushes.

Another object of the present invention is to provide a torque measuring device of such mechanical design as to be self compensating for relative changes of positions of the component parts due to temperature, end thrust of the shaft and bending of the shaft the torque loading of which is to be measured.

Another object of the present invention is to provide a torque measuring device that will respond to the slight circumferential or torsional distortions, that is, twist, of small gauge lengths of shafts.

A further object of the present invention is to provide a torque measuring device of compact construction that will be adaptable for use in relatively small spaces.

A specific object of the present invention is to provide a torque measuring device that may be calibrated statically.

A further specific object of the present invention is to provide a measuring device of balanced construction that it may operate at high speeds without introducing vibrations into the given shaft or shaft system.

A still further specific object of the present invention is to provide a torque measuring device adaptable for use on large diameter shafts as, for example, marine propeller shafts.

Other objects and advantages will become more apparent from a study of the following specification when considered in conjunction with the accompanying drawings, in which:

Fig. 7 is a view in full section illustrating a reversed or inside out construction of the invention illustrated in Fig. 5.

Fig. 8 is a sectional view taken on the line VIII—VIII of Fig. 7.

Fig. 9 is a view, partially in section, illustrating a modification of this invention as applied to large diameter shafts such as marine propeller shafts.

Fig. 10 is a sectional view taken on the line X—X of Fig. 9.

Fig. 11 is a sectional view of a portion of a further modification of this invention.

Fig. 12 is a partial view showing a modification of the invention illustrated in Fig. 10.

In many cases it is desirable to have a continuous indication of the power output of a prime mover. This condition is particularly true in the marine and aviation fields. In operating aircraft over long distances, for example, it is mandatory that fuel consumption be as economical as possible. Since an engine driving a propeller has a definite torque range in which the fuel consumption is relatively economical, suitable means for indicating in terms of torque and speed the power output of an engine provides means for readily obtaining the desired rate of fuel consumption.

The torque load of such an engine is accurately indicated by the elastic torque characteristic of the drive shaft or shaft system connected thereto, the torque characteristic in this case being the circumferential or torsional deflection of a known gauge length of shaft. With the apparatus disclosed in this specification, it is possible to utilize this torque characteristic to obtain an electrical measurement of the torque loading of the shaft.

A power measuring device of the type utilizing the torsional characteristic and speed of rotation of a shaft is disclosed in the copending application of F. W. Godsey, Jr., Serial No. 455,258, filed August 18, 1942, entitled Power measuring device for rotating shafts which is closely related to the present invention. Portions of the descriptive material appearing in said copending application have hereinbefore been included in this specification for the purpose of completeness.

As previously mentioned in reference to the inductor generator type of power measuring device, the shaft must be rotating before the device can be calibrated. The same condition ordinarily obtains in the power measuring device disclosed in the above-mentioned copending application. The present invention, while related in character to that of said copending application, is of a design that utilizes the torque characteristic only of the shaft to obtain a voltage indicative of the torque being transmitted. It is therefore possible to obtain a voltage indicative of the torque applied to the given shaft whether the shaft is rotating or stationary.

Broadly stated, the present invention is an electro-magnetic device including stationary electrical coil means; the device being sensitive to the torque characteristic of the shaft in a manner to cause a voltage to appear in the electrical coil means indicative of the torque in the shaft.

Figure 1:
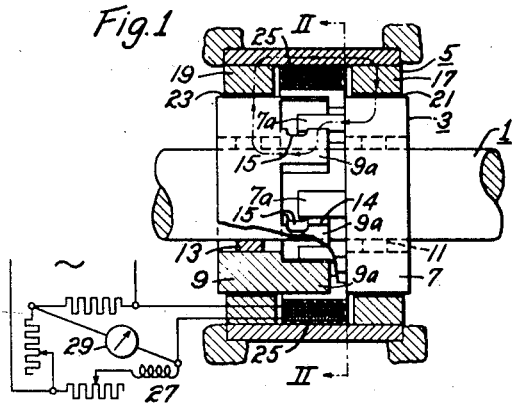
Figure 1 is a view partially in section of a torque measuring device embodying the fundamental principles of this invention.
Figure 2:
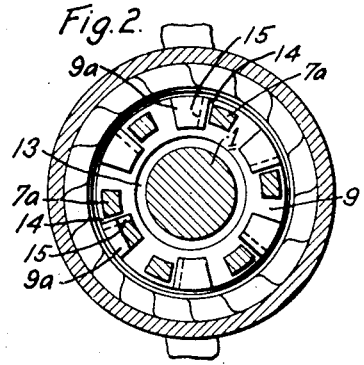
Fig. 2 is a sectional view taken on the line II—II of Fig. 1.

Referring now to the drawings there is illustrated in Figures 1 and 2 a torque measuring device embodying the fundamental principles of this invention and the description relating to these figures particularly as to its function will apply generally to all the modifications shown since there appears in all the figures a dual structure substantially of the character illustrated in Figs. 1 and 2 so that automatic compensation is provided for such undesirable effects as shaft temperature, bending of the shaft, end thrust of the shaft and shaft vibration. The manner in which this is accomplished will presently become clear.

Numeral 1 designates a shaft the torque loading of which is to be measured, numeral 3 indicates a rotor assembly, and numeral 5 indicates an annular stationary member which is concentrically positioned about the rotor assembly 3. The rotor assembly 3 comprises a pair of axially displaced torque rings 7 and 9 having axial extending finger portions 7a and 9a. These rings are made of magnetic material and are secured to rotate with the shaft on bushings of non-magnetic material 11 and 13 so that the circulating magnetic flux will not include the shaft if the shaft is made of steel. In addition the rings are spaced a predetermined axial distance apart to include a known gauge length of shaft therebetween. The fingers on each torque ring are equal in number and are positioned in interlocking relation so that each finger on each ring has a face portion of any one finger associated with one of said rings positioned in close proximity to a face portion of a corresponding finger associated with the other of said rings. Fig. 2 illustrates in exaggerated form a proportional positioning of the parts. In this manner air-gaps 14 are formed between each of the confronting face portions. In order to prevent variations in the confronting face areas radial grooves 15 are provided in one of the confronting face portions thus providing a limited axial face length on one of the face portions associated with each air-gap, the other face portion cooperating therewith being of sufficient axial length to overhang the axial face length of the limited face. The radial depth of one finger associated with each air-gap is greater than the radial depth of the finger cooperating therewith (see Fig. 2). The first mentioned expedient, namely the provision of the radial grooves 15, effectively maintains a substantially constant confronting face area when said rings are relatively axially displaced due to tension or compression loading of the shaft and the second mentioned expedient effectively maintains a substantially constant face area when said fingers are radially displaced or tilted due to bending of the shaft thereby automatically compensating for end thrust and bending of the shaft. Circumferential distortions of the shaft circumferentially displace one ring relative to the other thus increasing or decreasing the air-gaps 14 between each of the cooperating fingers.

The stationary member 5 is annular in shape and is concentrically positioned about the rotor assembly 3 so that each of the annular rings 17 and 19 forming the axial extremities of the stationary member have their inner peripheries or bores positioned in close proximity to the peripheries of the torque rings 7 and 9 thus forming two circular air-gaps 21 and 23. A coil 25 is secured within the annular recess of the stationary member formed by the annular rings 17 and 19 and for the purpose of illustrating one method of metering the voltage in the coil, the coil is shown connected as one leg in a conventional balanced Wheatstone bridge circuit 27, the bridge circuit being supplied from a suitable source of alternating current and adjusted to a balanced condition when the shaft is not loaded so that a voltage will not appear across the terminals of an indicating meter 29 connected across the bridge.

Upon suitable energization of the coil 25 a flow of alternating magnetic flux is induced in the stationary member 5 and the rotor assembly 3 which is indicated as circulating in a clockwise direction by the dotted arrows as illustrative of an instantaneous condition. Specifically the magnetic circuit includes the stationary member 5, air-gap 21, the right torque ring 7, a finger portion thereof 7a, an air-gap 14, finger portion 9a, torque ring 9, air-gap 23 and back to the stationary member 5. The air-gaps 21 and 23 are preferably so adjusted that the magnetic reluctance appearing thereacross is small compared to that of the air-gaps 14. It may now therefore be seen that, whether rotating or stationary, if the shaft is not transmitting torque, the circulating alternating magnetic flux will maintain a substantially constant effective or instantaneous value and the voltage in the coil 25 will maintain a correspondingly constant value. If, however, there is circumferential deflection of the shaft due to torque the air-gaps 14 formed by the interlocking fingers 7a and 9a will increase or decrease depending upon the direction of the distortion to substantially proportionally change the value of the circulating magnetic flux. Changes in the value of the magnetic flux correspondingly change the value of the voltage in the coil 25 thereby unbalancing the bridge circuit of which it forms one leg and causing a voltage to appear across the terminals of the indicating meter 29 indicative of the circumferential deflection or torque of the shaft.

From the foregoing disclosure it may now be seen that a novel form of magnetic strain gauge is provided in which the stationary member comprises the coil and core assembly and the rotor assembly comprises the armature. The structure disclosed however has the distinct advantage of eliminating the necessity for slip rings and brushes for supplying the current to the coil as is the case with the conventional magnetic strain gauge in which both the coil and core assembly and the armature usually rotate with the shaft. Fig. 1 serves to illustrate the fundamental principle of this invention which is essentially a magnetic strain gauge in which the electrical energy is transmitted to the rotating parts through magnetic air gaps instead of through the electrical contact between brushes and slip rings.

As previously mentioned the characteristic appearing in all the figures following Fig. 1 is the dual structure of the modification illustrated in Fig. 1. In these figures parts similar to those in Fig. 1 will be given like reference numerals.

Figure 3:
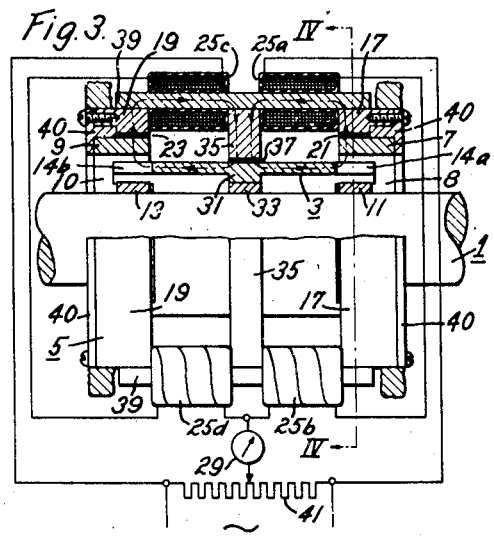
Fig. 3 is a view partially in section of a modification of this invention.
Figure 4:
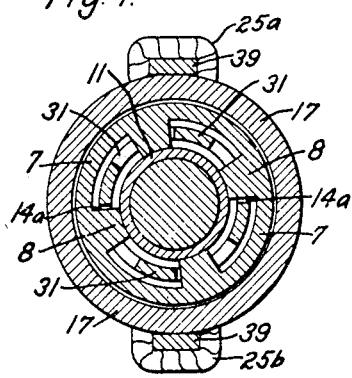
Fig. 4 is a sectional view taken on the line IV—IV of Fig. 3.

Referring now to Figs. 3 and 4 it may be seen that the torque rings no longer have portions of each thereof positioned in close proximity but are entirely separated and have a third ring 31, termed a reference ring, centrally disposed therebetween and secured to rotate with the shaft on a bushing 33 of non-magnetic material. In this embodiment of the present invention the torque rings have been modified and, instead of having the finger portions 7a and 9a as in Fig. 1, are provided with radial teeth 8 and 10. Reference ring 31 is provided with axially extending fingers in each of its extremities which are disposed in interlocking relation with the radial teeth of the torque rings 7 and 9 such that face portions of the fingers are positioned in close proximity to face portions of the radial teeth as clearly illustrated in Fig. 4. This positioning of parts form the air-gaps 14a and 14b. Further the positioning of the parts forming the air-gaps 14a and 14b provides a construction which, upon circumferential distortion of the shaft, will increase one air gap while decreasing the other, that is, the faces of the radial teeth of the torque rings confronting the fingers of the reference ring lie in the same axial plane, and the corresponding faces of the fingers lie in the same axial plane so that, upon circumferential distortion or twisting of the shaft and corresponding angular movement of the torque rings relative to the reference ring, the radial teeth of one torque ring will move away from the cooperating fingers of the reference ring and the radial teeth of the other torque ring will move closer to the cooperating fingers of the reference ring, thus increasing one air gap while decreasing the other.

Stationary member 5 comprises the rings 17 and 19 corresponding to rings 17 and 19 of Fig. 1 and in like manner their inner peripheries or bores are positioned in close proximity to the peripheries of the torque rings thus forming circular air gaps 21 and 23. A third ring 35 is disposed centrally of rings 17 and 19 and has its inner periphery or bore positioned in close proximity to the periphery of the reference ring forming a further circular air gap 37. Axially disposed of the three rings and secured thereto on their peripheries are supporting bars 39 which serve to axially space and support the rings. Coils 25a, 25b, 25c and 25d are wound about each of the bar portions between each of the rings. In this modification of the invention rings 40 of bearing material secured to the stationary member 5 in sliding contact with the peripheries of each of the torque rings are provided to maintain a fixed concentric disposition of the stationary member relative to the rotor assembly and further to prevent relative axial travel of either the stationary member or rotor assembly thus preventing errors introduced by radial displacement of either the rotor assembly or stationary member and effectively preventing changes in confronting face areas due to relative axial shift of the parts forming air gaps 21, 23 and 37. The bearings 40 may also be utilized, if made of suitable magnetic material, to complete the magnetic circuit thus either supplementing or eliminating the air-gaps 21 and 23.

As shown in the drawings, each pair of coils associated with each torque ring are connected in series circuit relation, that is, coils 25a and 25b are in series and coils 25c and 25d are in series, each pair in series being further connected to form one leg of a conventional bridge circuit. Upon suitable energization of the coils a magnetic flux linked with each coil may be induced to flow in the stationary member and rotor assembly in the instantaneous directions indicated by the arrows and which at zero torque of the shaft may be adjusted, assuming the air-gap characteristics to be equal, by the potentiometer slider on the potentiometer 41, each half of which forms one leg of the bridge circuit, so that the magnetic induction across the air-gaps 21 and 14a, for example, associated with coils 25a and 25b will be equal and opposite to that appearing across air-gaps 23 and 14b.

Assuming now that torque is being transmitted in a clockwise direction from left to right of the shaft it will be seen that the air gaps formed between the confronting faces of the torque ring 9 and the reference ring 31 will be increased while those formed between the confronting faces of the torque ring 7 and the reference ring 31 will be decreased thus unbalancing the normal circulating magnetic flux associated with each coil to correspondingly increase the voltage in one pair of series coils while decreasing the voltage of the other pair of coils thus unbalancing the bridge circuit and causing a voltage to appear across the terminals of the indicating meter 29 connected across the bridge to measure unbalance therein. The voltage unbalance or difference between the coils being indicative of the circumferential distortion or torque applied to the shaft.

As an alternative, yet equally desirable form of the magnetic circuit described, the coils may be so energized as to induce flows of alternating magnetic flux in the stationary member and rotor assembly in such direction that they will oppose each other in the central ring 35 and for zero torque the total alternating magnetic flux in the central ring 35 preferably will be zero. Thus the magnetic circuit includes the bar 39, ring 17, air-gap 21, the right torque ring 7, air-gap 14a, reference ring 31, air-gap 14b, left torque ring 9, air-gap 23, and the ring 19 connected to the bar 39. When the shaft transmits torque air-gaps 14a and 14b formed between the torque rings and the reference ring are changed, one increasing while the other decreases, thereby unbalancing the magnetic circuit and causing an alternating magnetic flux to appear across the air-gap 37 and flow through the central ring 35. An alternating magnetic flux linked with one pair of coils is therefore increased while the other is decreased which correspondingly changes the value of voltage across each pair of coils to cause a voltage difference to appear across the terminals of the indicating meter indicative of the torque being transmitted by the shaft. When the coils are connected as described in this paragraph, the flux carrying elements of the torque-meter form in effect a magnetic bridge circuit.

It may be seen from Fig. 3 that upon passing a plane transversely of the structure centrally thereof, two structures will be obtained essentially of the same character as that indicated in Fig. 1, hence the term dual structure. It may further be seen that such undesirable effects as tilting of the torque rings relative to the reference ring due to shaft bending, which under some conditions may change the air gap characteristics, will have a like effect upon the air-gaps formed by each of the torque rings; these variations will be of a balanced nature, and will have but little effect upon the balance of the bridge and the indicator reading. Axial displacement of the torque rings relative to the reference ring due to end thrust will also have balanced effects upon the air gaps. In the same manner temperature effects and vibration effects are compensated for.

It is not to be construed from the descriptive disclosure hereinbefore made and the illustration of Fig. 3 that the structure of Fig. 3 may function only as shown since, in some cases, it may be desirable to have two coils only, for example, 25a and 25c. In still another case it may be desirable to increase the number of coils.

Fig. 3 may be still further modified, as shown in Fig. 11, by providing, in place of the central ring 35, a ring 35a of substantially the same structure as the torque rings 7 and 9, winding a pick-up coil 43 about each of the radial tooth portions thereof and connecting the coils thus formed in either suitable series or parallel circuit relation, the ring 35a thus forming a core member for the coils. The coils 25a and 25c will then be connected to a suitable source of alternating current and so energized as to induce a flow of alternating magnetic flux of such direction that the alternating magnetic fluxes associated with each of the coils 25a and 25c will oppose in the central ring 35a as indicated by the arrows. The alternating magnetic flux thus induced will be so adjusted by adjusting the voltage of the coils that for zero torque the total alternating magnetic flux in the central ring will be substantially zero. Thus when the shaft transmits torque flux will appear in the central ring by reason of the variations in the air gaps 14a and 14b between the torque rings and the reference ring; and the unbalanced alternating magnetic flux across air-gap 37 will generate a voltage in the pick-up winding 43 on this central ring indicative of the torque transmitted by the shaft.

Figure 5:
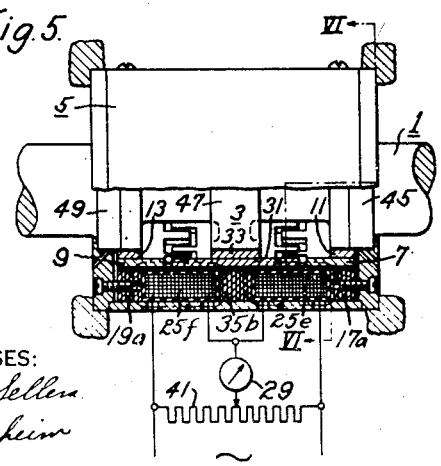
Fig. 5 is a view partially in section showing a modified form of the invention illustrated in Fig. 3.
Figure 6:
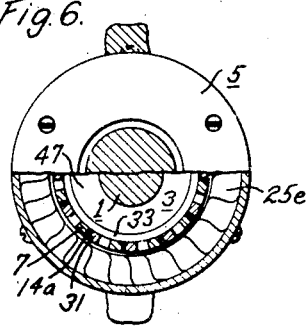
Fig. 6 is a sectional view taken on the line VI—VI of Fig. 5.

The function of the modification of the invention shown in Figs. 5 and 6 is substantially the same as that of Fig. 3. Temperature, vibration, shaft bending and end thrust effects are all automatically compensated for in a manner identical with the modification of Fig. 3. The design, of course, is much improved. By providing the flanges 45, 47 and 49 on the shaft and seating the elements of the rotor assembly thereon, circumferential distortion or deflection of the shaft surface on which the elements are secured is effectively avoided, the distortions of the shaft being largely restricted to the shaft lengths on either side of the flanges. This reduces the possibility of the various rotor elements shifting on the shaft surface from their predetermined settings. Relative axial shift between the stationary member and the rotor assembly, in this instance, is effectively prevented by providing bearings secured to the stationary member and seated on the flanges 45 and 49 which serve to concentrically position the stationary member about the rotor assembly and lock the stationary member and rotor assembly axially together. As may be seen from the drawings, the stationary member is annular in shape and is provided with laminated rings 17a, 35b, and 19a which have their inner bores positioned in close proximity to the peripheral surfaces of the rotor assembly. The laminated ring construction provides electrical characteristics more favorable to the flow of an alternating magnetic flux. Circular coils 25e and 25f are located in the annular recesses formed in the stationary member by the rings 17a, 35b and 19a, each coil being connected in a bridge circuit as one leg thereof such that unbalances in the voltage in the coils due to torque of the shaft will unbalance the bridge circuit, which unbalance is measured by the meter 29.

In many cases of shaft installations space limitations are such that it is impossible to attach a power or torque measuring device about the shaft. In installations of this type, where a hollow shaft may be utilized having one end thereof accessible, a reversed or inside-out modification of the structure illustrated in Fig. 5 may be used. This adaptation of the invention is illustrated in Figs. 7 and 8. A hollow shaft 1a may be supplied with power through a spur gear 51. The shaft installation is shown supported on its right end on a bearing race 53 seated on a housing 55, a fragmentary portion of which is shown. Rotor assembly 3a, is positioned internally of the shaft, the torque rings and the reference ring being relatively disposed as previously described. The stationary member 5a comprises a tubular support 57, the rings 17, 19 and 35 and the circular coils 25e and 25f positioned in the annular recesses between the rings. The coil leads are brought out through the tubular member and the coils are connected each as one leg in the conventional bridge circuit. Concentric positioning and axial locking of the stationary member relative to the rotor assembly is accomplished by means of the bearing supports 59 and 61 and the stationary member is stationarily secured to the housing 55 or other convenient stationary support.

On large diameter shafts as, for example, marine propulsion shafts it often is not practical to build a torque measuring device to completely encircle the shaft. The modification illustrated in Figs. 9 and 10 adapted to measure the torque of this character of shaft is similar to that of Fig. 3 with the exception that the stationary member does not completely encircle the shaft and the rotor assembly is slightly modified to more practically suit the conditions. Two stationary members are here provided although one would be sufficient and more than two may be used if desirable. The coils 25a, 25b, 25c and 25d are here also arranged with each pair of coils associated with each torque ring connected in series circuit and each pair of coils forming one leg of a bridge circuit. The rotor assembly comprises the usual torque rings 7 and 9 and the reference ring 31 having fingers projecting therefrom positioned in close proximity in the manner previously described. Circular segments of the stationary member are concentrically positioned in close proximity to the peripheral torque ring and reference ring surfaces. The expedient of employing fewer fingers on the several rings, as previously mentioned, is but practical application since the device will operate satisfactorily should there be but one air gap formed between each ring. A means for maintaining accurate spacing between the stationary members and rotor assembly is illustrated in Fig. 12 in which a bearing surface of non-magnetic bearing material 62 is secured to the stationary member. This material is of predetermined thickness and permits the stationary members to follow the shaft motion which may result from vibration thus maintaining a predetermined spacing between the elements.

From the foregoing it is obvious that applicants, with their novel form of torque measuring device, have provided means for continuously indicating or measuring the torque being transmitted by a shaft whether rotating or stationary. The inventive electromagnetic device, or more specifically, magnetic strain gauge, operable in response to slight circumferential distortions of the shaft and serving as the shaft pickup element, provides means for indicating shaft torque in a degree of accuracy previously unobtainable. Furthermore, it will be seen upon inspection of the various illustrations in the drawings that the torque measuring device will operate satisfactorily at high speeds of rotation by reason of its balanced construction. By utilizing magnetic air gaps for transmitting electrical energy to the rotating parts and providing all electrical windings on the stationary member, the necessity for slip rings and brushes with their error introducing electrical characteristics is eliminated and, in addition, due to the highly sensitive yet stable operation of the device the need for relatively long gauge length of shafts for obtaining the necessary magnitude of circumferential deflection is also eliminated.

The foregoing disclosure and the showings made in the drawings are merely illustrative of the principles of this invention and are not to be interpreted in a limiting sense. The only limitations are to be determined from the scope of the appended claims.

We claim as our invention:

1. Apparatus for continuously measuring the torque of a shaft comprising, in combination, a rotor assembly having elements therein relatively displaceable upon circumferential distortion of said shaft due to torque, a stationary member, coil means secured to said stationary member, a source of alternating current for energizing said coil means, said coil means being adapted to induce a flow of alternating magnetic flux in said stationary member and said rotor assembly upon energization thereof, said elements in said rotor assembly being adapted to change the value of said alternating magnetic flux upon relative displacement thereof thereby changing the value of a voltage in said coil means, and means for measuring the voltage whereby the torque of said shaft is indicated.

2. Apparatus for continuously indicating the torque of a shaft comprising, in combination, a rotor assembly having elements therein relatively displaceable upon circumferential distortion of said shaft due to torque, a stationary member, coil means secured to said stationary member, a source of alternating current for energizing a portion of said coil means, said portions of said coil means being adapted to induce a flow of alternating magnetic flux in said stationary member and said rotor assembly upon energization thereof, said elements in said rotor assembly being adapted to change the value of said alternating magnetic flux upon relative displacement thereof thereby changing the value of a voltage in said coil means, and means for measuring the voltage whereby the torque of said shaft is indicated.

3. Apparatus for continuously measuring the torque of a shaft comprising, in combination, a rotor assembly secured to rotate with said shaft, a stationary member having portions thereon concentrically disposed relative to conforming portions of said rotor assembly such that a substantially constant spacing exists therebetween, coil means secured to said stationary member, a source of alternating current for energizing said coil means, said coil means being adapted to induce a flow of magnetic flux in said stationary member and said rotor assembly upon energization thereof, a pair of axially spaced rings included in said rotor assembly relatively angularly displaceable upon circumferential distortion of said shaft, said rings having portions thereon adapted to change the value of said magnetic flux upon such relative displacement thereby changing the value of a voltage in said coil means, and a meter for metering the voltage whereby the torque of said shaft is measured.

4. Apparatus for continuously measuring the torque of a shaft comprising, in combination, stationary coil means, a magnetic bridge circuit associated with said stationary coil means, a source of alternating current for inducing a balanced flow of magnetic flux in said magnetic bridge circuit when torque in said shaft is zero, means included in said magnetic bridge circuit responsive to circumferential deflection of said shaft due to torque for unbalancing the values of the magnetic flux linkages with each of said coils, and means for measuring said unbalanced magnetic flux linkages whereby the torque of said shaft is indicated.

5. Apparatus of the character referred to in claim 4 in which said last mentioned means comprises a pick-up coil so positioned that the unbalanced magnetic flux links said pick-up coil.

6. Apparatus for continuously measuring the torque of a shaft comprising, in combination, a rotor assembly secured to rotate with said shaft, a stationary member, at least two coils secured to said stationary member, a source of alternating current for energizing said coils, said coils being adapted to induce a flow of magnetic flux in said stationary member and said rotor assembly such that each coil has a circulating magnetic flux linked therewith, said coils having voltages therein of substantially equal value when said shaft is not subject to torque, means including a plurality of relatively displaceable elements included in said rotor assembly relatively displaceable in response to circumferential distortion of said shaft due to torque for changing the value of magnetic fluxes linked with each of said coils such that a voltage difference appears between said coils, and means for measuring said voltage difference whereby the torque of said shaft is measured.

7. Apparatus for continuously measuring the torque of a shaft comprising, in combination, a rotor assembly secured to rotate with said shaft, stationary means, at least two coils secured to said stationary means, a source of alternating current for energizing said coils, said coils being adapted to induce a flow of magnetic flux in said stationary means and said rotor assembly such that each coil has a circulating magnetic flux linked therewith, said coils having voltages therein of substantially equal value when said shaft is not subject to torque, said rotor assembly comprising a pair of axially spaced rings secured to said shaft and a reference ring centrally disposed thereof also secured to said shaft, said axially spaced rings having portions thereon positioned in close proximity to conforming portions on said reference ring such that at least one air gap is formed between each of said axially displaced rings and said reference ring, the assembly being such that circumferential distortion of said shaft due to torque will increase an air gap associated with one torque ring while decreasing an air-gap associated with the other torque ring, thus increasing the value of magnetic flux linkage with one of said coils while decreasing the other thereby causing a voltage difference to appear between said coils, means for measuring the voltage difference whereby the torque of said shaft is measured.

8. Apparatus of the character referred to in claim 7 in which said stationary means is concentrically disposed about said rotor assembly such that annular portions of said stationary member are positioned in close proximity to conforming portions of said rotor assembly thereby forming a substantially constant circular air-gap therebetween.

9. Apparatus of the character referred to in claim 7 in which said stationary means is concentrically disposed within said rotor assembly such that circular portions of said stationary member are positioned in close proximity to conforming portions of said rotor assembly thereby forming a substantially constant circular air-gap therebetween.

10. Apparatus of the character referred to in claim 7 in which said stationary means includes at least one stationary member having circular portions thereof concentrically positioned in close proximity to conforming portions of said rotor assembly such that a substantially constant air-gap is maintained therebetween.

11. Apparatus of the character referred to in claim 3 in which said portions on said rings are axially extending fingers having face portions thereof positioned in close proximity, at least one of said faces being provided with a radial groove such that a face of limited axial length is formed, the other of said faces overhanging the axial extremities of the face portion thus formed such that relative axial movement of said fingers due to compression or tension loading of said shaft will not effectively vary the area of the confronting faces.

12. Apparatus of the character referred to in claim 3 in which said portions on said rings are axially extending fingers having face portions thereof positioned in close proximity, one of said faces having a radial depth greater than that of the other such that radial movement of one finger relative to the other due to bending of the shaft will not effectively vary the area of the confronting faces.

13. Apparatus of the character referred to in claim 7 in which said portions on said reference ring are axially extending fingers and said portions on said axially spaced rings are radially extending teeth.

14. Apparatus of the character referred to in claim 7 in which said portions on said reference ring are axially extending fingers and said portions on said axially spaced rings are axially extending fingers.

15. An electromagnetic device comprising, in combination, stationary electrical coil means, a core member associated therewith, a rotatable armature assembly having portions thereon positioned in close proximity to conforming portions on said core member such that substantially constant air gaps are maintained therebetween, a source of alternating current for energizing said electrical coil means thereby inducing a flow of magnetic flux in said core member and said armature assembly, relatively movable elements included in said armature assembly for changing the value of said magnetic flux thereby varying the reactance of said electrical coil means and inducing a voltage therein indicative of the relative movement of said relatively movable elements.

16. Apparatus for continuously measuring the torque of a shaft comprising, in combination, a core member, coil means associated with said core member, at least two magnetic flux paths each including said core member as a common leg thereof, means for inducing equal and opposed alternating magnetic fluxes in each of said magnetic flux paths whereby the total alternating magnetic flux in a portion of said core member is substantially zero when said shaft is transmitting zero torque, means responsive to the torque characteristics of said shaft for causing an unbalanced magnetic flux to appear in said portion of said core member thereby inducing a voltage in said coil means indicative of such unbalance, and means for metering the voltage whereby the torque of said shaft is measured.

17. In a device for indicating the torque of a shaft, comprising, in combination; a magnetizable rotor assembly secured to the shaft to rotate with said shaft; a magnetizable stationary member; electric coil means mounted on said stationary member; a magnetic circuit, including said stationary magnetizable member and said magnetizable rotor assembly; means for energizing said electric coil means with alternating current to thus produce an alternating magnetic flux in said magnetic circuit; means, forming a part of said magnetizable rotor assembly and thus being a part of said magnetic circuit, responsive to circumferential deflections of said shaft due to torque for changing the value of said alternating magnetic flux thereby inducing a voltage in said electrical coil means indicative of the torque of said shaft.

18. In a device for indicating the torque of a shaft, comprising, in combination, stationary electric coil means; magnetic circuit means, including flux paths linking said electric coil means; means for producing an alternating magnetic flux in said magnetic flux paths; means, including a plurality of relatively displaceable elements included in each of said magnetic flux paths variable in relative position of its elements in response to the torque of said shaft, for changing the value of said alternating magnetix flux, whereby voltages are induced in said stationary coil means indicative of the torque of said shaft.

19. Apparatus for measuring the peripheral displacement of first and second regions of a rotatable means from one another, said apparatus comprising first and second means connected, respectively, with said first and second regions so as to be rotatable with the rotatable means and having portions of relatively high magnetic permeability closely adjacent one another with a spacing between them of relatively high reluctance varying in accordance with change in peripheral displacement of the said first and second regions of the rotatable means, a stationary annular flux-carrying member of high magnetic permeability of U section surrounding the rotatable means with the open end of the U adjacent the rotatable means and the portions of high magnetic permeability for forming with the portions a path for magnetic flux, a stationary coil surrounding the rotatable means and positioned within the stationary member, means for causing an alternating current to flow in the coil, and means connected with the coil for indicating the inductance of the coil and the flux path formed of the stationary annular member and the said portions of high magnetic permeability as a measure of the peripheral displacement of the said first and second regions of the rotatable means.

20. In measuring means associated with a rotary shaft, three spaced non-magnetic rings secured to the shaft, magnetic bands mounted on the two outside rings having teeth projecting inwardly, a third magnetic band mounted upon the center ring having teeth projecting outward on both sides to cooperate with the other teeth to define magnetic paths, a stationary sleeve mounted around the shaft, a plurality of groups of laminations carried by the sleeve in substantial alignment with the magnetic bands, inductance coils mounted between the lamination groups to create a magnetic field and bearing means on at least a portion of the laminated groups upon which the associated bands may revolve.

21. In measuring means for studying the characteristics of a rotating structural member, an indicating means, a balanced bridge connected thereto, an inductance means connected to one arm of the bridge, stationary core means therefor having spaced projecting portions, a plurality of relatively movable magnetic means mounted in spaced relation on said member to rotate between the spaced portions, and means for mounting said core means at spaced positions around the rotatable means whereby distortion of the member will move the magnetic means relatively and cause a change in the reluctance of a magnetic circuit and an indication on the indicating means.

BERNARD F. LANGER.
FRANK W. GODSEY, Jr.

REFERENCES CITED

The following references are of record in the file of this patent:

UNITED STATES PATENTS

| Number | Name | Date |
| --- | --- | --- |
| 2,173,039 | Muir | Sept. 12, 1939 |
| 2,220,007 | Winther et al. | Oct. 29, 1940 |
| 2,270,760 | Mershon | Jan. 20, 1942 |

FOREIGN PATENTS

| Number | Country | Date |
| --- | --- | --- |
| 4,669 | Great Britain | A. D. 1910 |
| 393,174 | Germany | Mar. 29, 1924 |